United States Patent
Mori

(10) Patent No.: US 8,958,656 B2
(45) Date of Patent: Feb. 17, 2015

(54) CONTOUR CORRECTION DEVICE

(75) Inventor: Hirotoshi Mori, Gunma-ken (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 74 days.

(21) Appl. No.: 13/480,507

(22) Filed: May 25, 2012

(65) Prior Publication Data

US 2012/0301049 A1  Nov. 29, 2012

(30) Foreign Application Priority Data

May 27, 2011  (JP) .................. 2011-119197

(51) Int. Cl.
*G06K 9/40* (2006.01)
*G06T 5/00* (2006.01)

(52) U.S. Cl.
CPC ....... *G06T 5/003* (2013.01); *G06T 2207/10016* (2013.01); *G06T 2207/20012* (2013.01); *G06T 2207/20192* (2013.01)
USPC ......................................... 382/266; 382/261

(58) Field of Classification Search
None
See application file for complete search history.

(56) References Cited

U.S. PATENT DOCUMENTS

| | | | | |
|---|---|---|---|---|
| 5,231,677 A | * | 7/1993 | Mita et al. ..................... | 382/266 |
| 5,343,254 A | * | 8/1994 | Wada et al. ................... | 348/627 |
| 6,285,798 B1 | * | 9/2001 | Lee ............................... | 382/260 |
| 6,480,300 B1 | * | 11/2002 | Aoyama ....................... | 358/1.9 |
| 2006/0139376 A1 | * | 6/2006 | Le Dinh et al. ............... | 345/660 |
| 2008/0123989 A1 | * | 5/2008 | Lin et al. ....................... | 382/275 |
| 2008/0199099 A1 | * | 8/2008 | Michel et al. ................. | 382/260 |
| 2011/0187935 A1 | | 8/2011 | Omori et al. | |
| 2012/0189208 A1 | * | 7/2012 | Inaba et al. ................... | 382/195 |

FOREIGN PATENT DOCUMENTS

JP         2011035776 A         2/2011

* cited by examiner

*Primary Examiner* — Li Liu
(74) *Attorney, Agent, or Firm* — Rennie William Dover

(57) ABSTRACT

A contour correction device is provided having a video image judging unit which executes an edge detection process to detect a change of a signal in a video image as an edge portion, and a texture detection process to detect a texture portion in which a change of signal smaller than the edge portion in the video image repeatedly appears, and a contour component gain adjusting unit which applies contour correction processes which differ from each other to the edge portion and the texture portion.

19 Claims, 9 Drawing Sheets

|  S(1,5) | S(2,5) | S(3,5) | S(4,5) | S(5,5) |
|---|---|---|---|---|
| S(1,4) | S(2,4) | S(3,4) | S(4,4) | S(5,4) |
| S(1,3) | S(2,3) | S(3,3) | S(4,3) | S(5,3) |
| S(1,2) | S(2,2) | S(3,2) | S(4,2) | S(5,2) |
| S(1,1) | S(2,1) | S(3,1) | S(4,1) | S(5,1) |

FIG. 2

CONTOUR CORRECTION DEVICE

CROSS-REFERENCE TO RELATED APPLICATION(S)

The entire disclosure of Japanese Patent Application No. 2011-119197 filed on May 27, 2011, including specification, claims, drawings, and abstract, is incorporated herein by reference in its entirety.

BACKGROUND

1. Technical Field

The present invention relates to a contour correction device.

2. Background Art

A contour correction device is in use for correcting a contour of a video image and preventing blurring of a video image by emphasizing a harmonic component of a video image signal.

As shown in FIG. 7, a contour correction device 100 of related art comprises a high-frequency pass filter (HPF) 10, a multiplier 12, a limiter and coring processor 14, and an adder 16. An input video image signal is input to the HPF 10, only signals of a frequency band of greater than or equal to a predetermined cutoff frequency are extracted, and, after an amount of correction is adjusted by the multiplier 12, the extracted signals are input to the limiter and coring processor 14. As shown in FIG. 8, the limiter process is a process to limit the absolute value of the extracted contour component so that the absolute value does not exceed a predetermined limit value. As shown in FIG. 8, the coring process is a process to inhibit the absolute value of the output signal when the absolute value of the extracted contour component is within a predetermined range. The signal to which these processes are applied is added to the input signal by the adder 16, and the resulting signal is output. In FIG. 8, the input signal to the limiter and coring processor 14 is shown by a broken line and the output signal is shown by a solid line.

With such a process, a high-frequency component of the video image signal is emphasized, the contour of the video image is corrected, and sharpness of the video image is improved.

In the contour correction device of related art, the contour correction process is uniformly applied independent of the video image signal. Because of this, as shown in FIG. 9, an edge (contour) component having a large change is emphasized, but a texture component which is a fine change is not significantly emphasized, and the effect of the contour correction has been insufficient. On the other hand, if the gain is to be increased in order to emphasize the fine texture component, there has been a problem in that the edge (contour) component is emphasized too much.

In addition, when noise is superposed on a flat portion having a small change as a video image, there has been a problem in that the noise component is emphasized when the noise component cannot be removed by the coring process.

Moreover, with the emphasis of the edge portion, there has been a problem that ringing may be caused in which the brightness of a peripheral portion of the edge becomes excessively high, resulting in a white display.

SUMMARY

According to one aspect of the resent invention, there is provided a contour correction device, comprising a video image judging unit which executes an edge detection process to detect a change of a signal in a video image as an edge portion and a texture detection process to detect a texture portion in which a change of signal smaller than the edge portion repeatedly appears in the video image, and a contour correction unit which applies contour correction processes which differ from each other to the edge portion and to the texture portion.

BRIEF DESCRIPTION OF THE DRAWINGS

FIG. 2 is a diagram for explaining a process target pixel, an edge detection range, a texture detection range, or the like in a preferred embodiment of the present invention.

DESCRIPTION OF EMBODIMENTS

Figure 1:
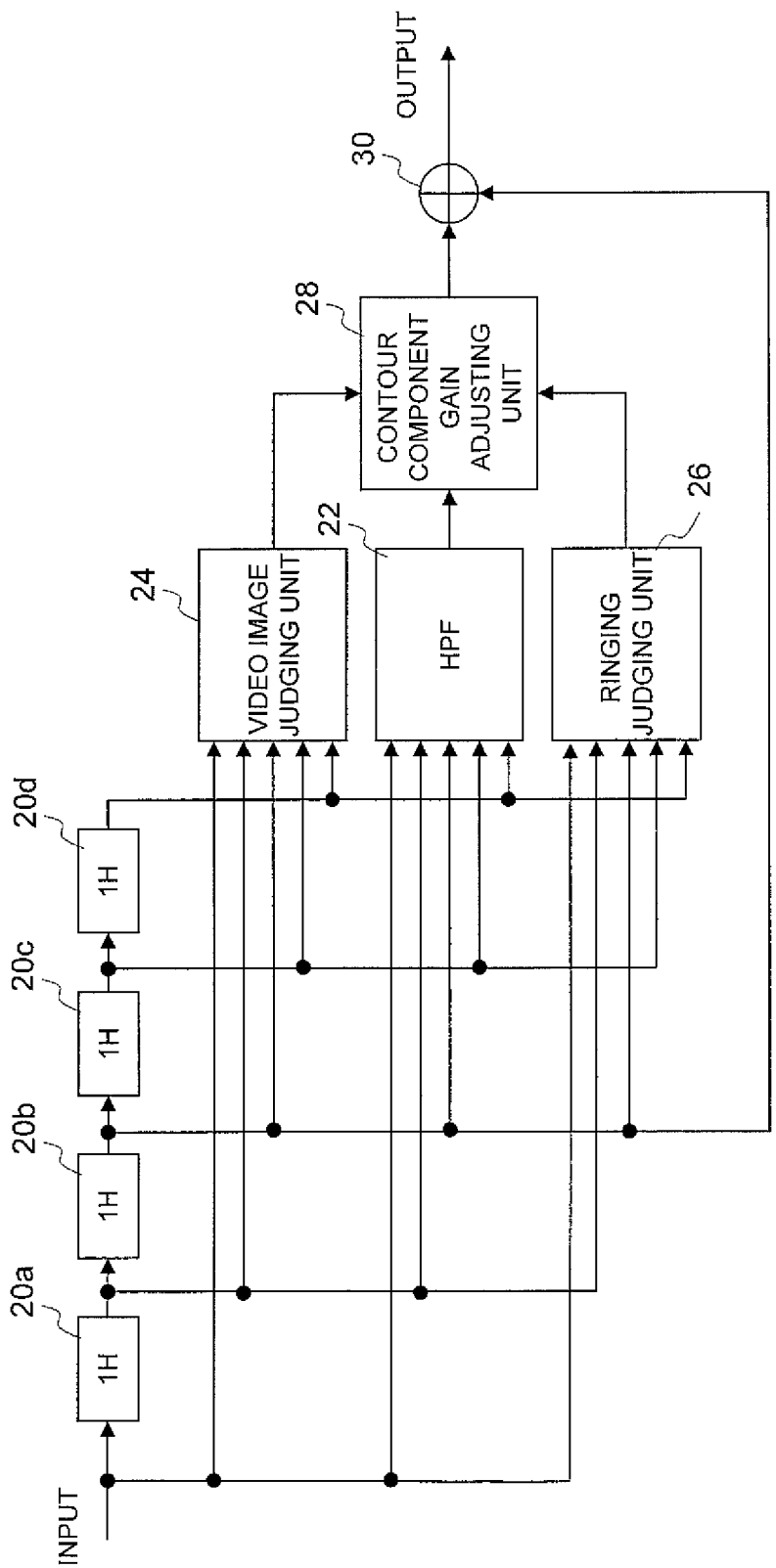
FIG. 1 is a diagram showing a structure of a contour correction device in a preferred embodiment of the present invention.

As shown in FIG. 1, an adaptive contour correction device 200 in a preferred embodiment of the present invention comprises delay units 20a-20d, a high-frequency pass filter (HPF) 22, a video image judging unit 24, a ringing judging unit 26, a contour component gain adjusting unit 28, and an adder 30.

Each of the delay units 20a-20d delays an input video image signal by a predetermined time period and outputs a resulting signal. In the present embodiment, each of the delay units 20a-20d delays the video image signal by one horizontal line and outputs the resulting signal. The output signals from the delay units 20a-20d are input to the HPF 22, the video image judging unit 24, and the ringing judging unit 26.

The HPF 22 receives the output signals from the delay units 20a-20d, extracts high-frequency components of the video image signal with a predetermined cutoff characteristic, and outputs the extracted high-frequency components. The passing characteristic of the HPF 22 is preferably set to a characteristic to pass a signal of a frequency band to emphasize the contour portion and texture portion within a video image in the contour component gain adjusting unit at the downstream. An output of the HPF 22 is input to the contour component gain adjusting unit 28.

A pixel of a video image which is to be processed at the HPF 22 will hereinafter referred to as a process target pixel. For example, as shown in FIG. 2, 5 pixels consecutive in a vertical direction on 5 horizontal lines are set as a process target range, and a pixel S(3,3) at the center of the process target range is set as a process target pixel. That is, in the HPF 22, a high-frequency component of the pixel S(3,3) is extracted and output. When the contour correction process for one process target pixel is completed, the process is moved to the next pixel (pixel S(3,4)), and the process is continued in this manner for all pixels in the video image.

Figure 3:
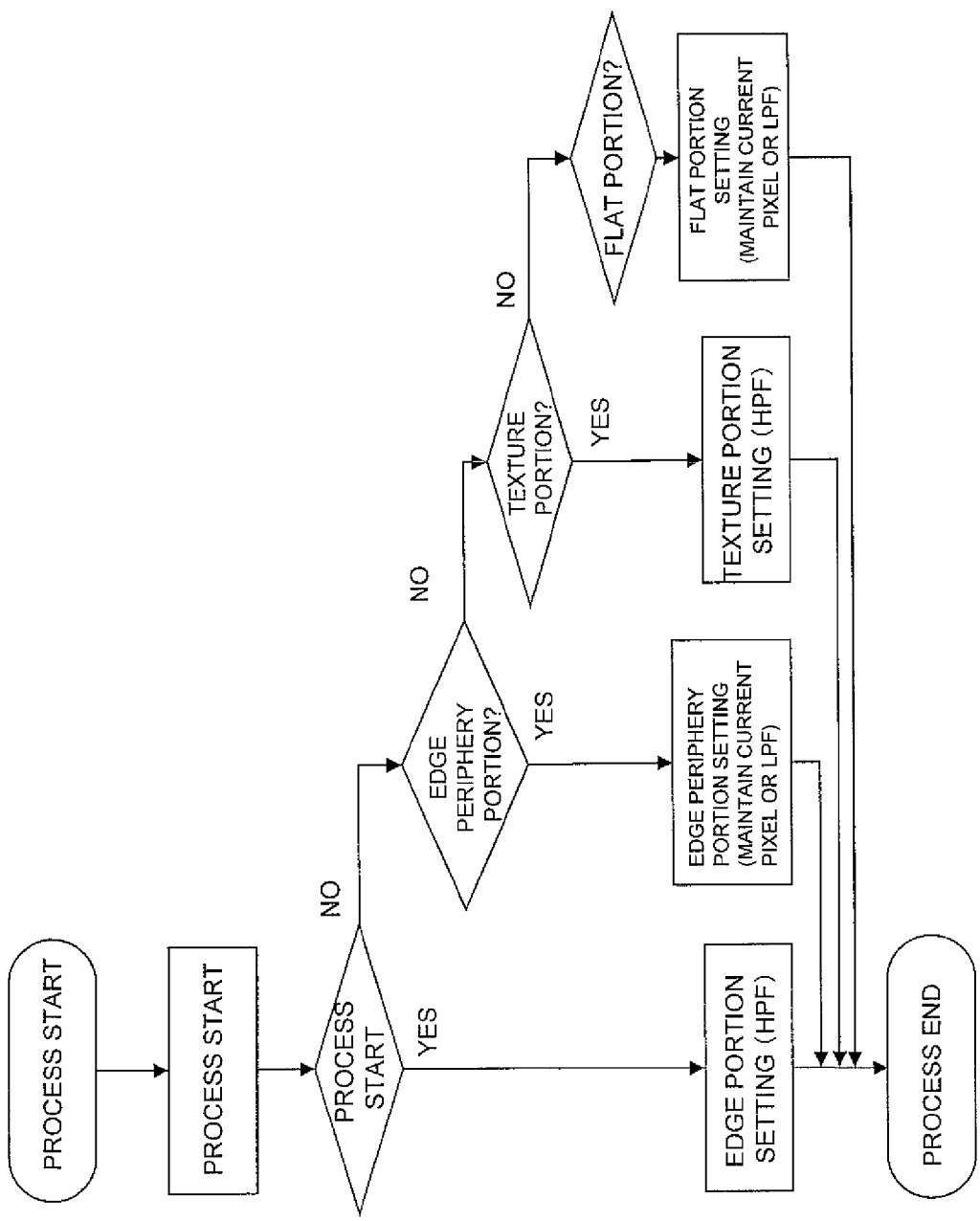
FIG. 3 is a flowchart showing a video image judging process in a preferred embodiment of the present invention.

The video image judging unit 24 receives the output signals from the delay units 20a-20d, and judges whether the process target pixel corresponds to a contour portion (edge portion), an edge periphery portion, a texture portion, or a flat portion. The judgment process at the video image judging unit 24 is executed according to a flowchart of FIG. 3.

First, an edge detection process is executed. The edge detection process is executed for the process target range (edge detection range) within the video image. The edge detection range is set to a predetermined range from the process target pixel. In the present embodiment, for example, when the pixel S(3,3) is the process target pixel in FIG. 2, 9 pixels, that is, pixels S(2,2), S(2,3), S(2,4), S(3,2), S(3,3), S(3,4), S(4,2), S(4,3), and S(4,4), are set as the edge detection range. Each pixel in the edge detection range is set as a pixel of interest, a difference between the pixel of interest and a pixel adjacent to the pixel of interest in the horizontal direction or the vertical direction is determined, and when there is a pixel of interest in which the difference is greater than or equal to a predetermined edge detection threshold value, the pixel S(3,3) which is the process target pixel is judged as an edge portion.

When the process target pixel is not the edge portion, next, an edge periphery detection process is executed. The edge periphery detection process is executed for the edge detection range and peripheral pixels thereof. In the present embodiment, for example, when the pixel S(3,3) is the process target pixel in FIG. 2, each of pixels surrounding the edge detection range, that is, pixels S(1,1)-S(1,5), S(2,1), S(2,5), S(3,1), S(3,5), S(4,1), S(4,5), and S(5,1)-S(5,5), are set as a pixel of interest, a difference between the pixel of interest and a pixel adjacent to the pixel of interest in the horizontal direction or the vertical direction is determined, and when the difference is greater than or equal to a predetermined edge detection threshold value, the pixel S(3,3) which is the process target pixel is judged as an edge periphery portion.

When the process target pixel is not the edge periphery portion, a texture detection process is executed. The texture detection process is executed for a process target range (texture detection range) in the video image. The texture detection range is set to a predetermined range from the process target pixel. In the present embodiment, when the pixel S(3,3) is the process target pixel in FIG. 2, 25 pixels, that is, pixels S(1,1)-S(5,5) are set as the texture detection range. In the texture detection process, one of the pixels in the texture detection range is set as a pixel of interest, and a number of boundaries between the pixel of interest and an adjacent pixel is calculated in which a difference between the pixel of interest and a pixel adjacent to the pixel of interest in the horizontal or vertical direction is greater than or equal to a texture detection threshold value. For example, the boundary between the pixels S(1,1) and S(1,2) and the boundary between the pixels S(1,1) and S(2,1) correspond to this boundary. In the present embodiment, the number of boundaries of adjacent pixels is 20 in the horizontal direction and 20 in the vertical direction, totaling 40 boundaries. When the number of boundaries of the adjacent pixels in which the difference is greater than or equal to texture detection threshold value is greater than or equal to a predetermined number (texture judgment threshold value), the pixel S(3,3) which is the process target pixel is judged as a texture portion.

The texture detection threshold value is set to a value smaller than the edge detection threshold value. In other words, the texture portion is judged for a location where the change is smaller than the edge (contour) portion included in the video image, but a large number of the small changes occur.

The process target pixel which is not judged as any of the edge portion, the edge periphery portion, and the texture portion in the above-described processes is judged as the flat portion.

The judgment result at the video image judging unit 24 is input to the contour component gain adjusting unit 28. The contour component gain adjusting unit 28 receives the judgment result of the video image judging unit 24, sets a gain (amplification) of the signal from the HPF 22, the range (limit value) of the limiter process, and the target range of the coring process according to the judgment result, and adjusts a gain of the contour component extracted by the HPF 22. The contour component gain adjusting process will be described later.

The ringing judging unit 26 receives the outputs signals from the delay units 20a-20d, and calculates a degree of ease of occurrence of ringing at the process target pixel in consideration of the contour (edge) of the video image, flatness, and inclination, based on the process target pixel and peripheral pixels.

The ringing judging unit 26 sets a predetermined range from the process target pixel as a ringing judging range, and executes the ringing judging process. In the ringing judging process, it is judged that the probability that the ringing will occur is higher when there is a contour having a large change at the periphery of the process target pixel and the periphery thereof is a flat portion.

The ringing judging process is executed, for example, in the following manner. Here, an example process will be described in which the degree of possibility of occurrence of ringing is determined for a left side of the process target pixel. When the process target pixel is the pixel S(3,3) in FIG. 2, a first difference value D1=(pixel value of pixel S(3,3)−pixel value of pixel S(3,2)), a second difference value D2=(pixel value of pixel S(3,2)−pixel value of pixel S(3,1)), a third difference value D3=(pixel value of pixel S(3,4)−pixel value of pixel S(3,3)), and a fourth difference value D4=(pixel value of pixel S(3,5)−pixel value of pixel S(3,4)) are calculated. It is then checked whether or not these values correspond to the below-described conditions, and the degree of ease of occurrence of ringing is determined based on the result.

Condition (1): A large edge exists on the left side of the process target pixel. A specific condition is that a sum of the first difference value D1 and the second difference value D2 is greater than 2 times a first ringing threshold value.

Condition (2): Right side of the process target pixel is flat. A specific condition is that an absolute value of the third difference value D3 is smaller than 2 times a second ringing threshold value and the absolute value of the third difference value D3 is greater than or equal to an absolute value of the fourth difference value D4 or the absolute value of the fourth difference value D4 is smaller than the second ringing threshold value.

Condition (3): The right side of the process target pixel is flat. The absolute value of the third difference value D3 and the absolute value of the fourth difference value D4 are both smaller than 2 times the second ringing threshold value.

Condition (4): A small edge exists on the left side of the process target pixel. A specific condition is that a sum of the first difference value D1 and the second difference value D2 is greater than the first ringing threshold value.

Condition (5): Changes on the left side of the process target pixel are of the same tendency. A specific condition is that the signs (positive or negative) of the first difference value D1 and the second difference value D2 are the same.

Condition (6): The right side of the process target pixel is flat. A specific condition is that the absolute value of the third difference value D3 and the absolute value of the fourth difference value D4 are both smaller than the second ringing threshold value.

Here, the first ringing threshold value is a threshold value for detecting the presence of an edge (contour), the second ringing threshold value is a threshold value for detecting the presence of the flat portion, and the first ringing threshold value is set to a value greater than the second ringing threshold value.

When the conditions (1) and (2) are satisfied, it is judged that the possibility of occurrence of the ringing in the process target pixel is the highest. In this case, the degree of occurrence of ringing is set to level 2. When the conditions (1) and (3) are satisfied, it is judged that the possibility of occurrence of ringing in the process target pixel is medium. In this case, the degree of occurrence of ringing is set to level 1. When the condition (1) is satisfied but conditions (2) and (3) are not satisfied, it is judged that the possibility of occurrence of ringing in the process target pixel is low. In this case, the degree of occurrence of ringing is set to level 0.

When the tendency of change of the adjacent pixels including the process target pixel is equal, the ringing tends to not occur. Therefore, as an additional condition, when the signs (positive or negative) of the first difference value D1, the second difference value D2, and the third difference value D3 are the same sign, the level of degree of the occurrence of ringing may be reduced by 1.

When all of the conditions (4)-(6) are satisfied, it is judged that the possibility of occurrence of ringing in the process target pixel is medium. In this case, the degree of occurrence of ringing is set to level 1.

An example process has been described in which the degree of possibility of occurrence of ringing is determined for the left side of the process target pixel. Similarly, the degree of possibility of occurrence of ringing is determined for each of the right side, upper side, and lower side of the process target pixel. In this case, the above-described process may be symmetrically executed for the pixel S(3,3). Of the levels determined for the left side, the right side, the upper side, and the lower side of the process target pixel, the largest value is set as the level of the process target pixel. The judgment result of the ringing judging unit 26 is input to the contour component gain adjusting unit 28.

In this manner, the ringing judging unit 26 judges the degree of possibility of occurrence of ringing as a level. The level indicating the degree of occurrence of ringing is not limited to the above-described setting. Finer levels may be set according to the respective conditions. For example, in the above-described example configuration, the case when the conditions (1) and (3) are satisfied and the case when all of the conditions (4)-(6) are satisfied are both set to level 1, but alternatively, different levels may be set for these cases.

The contour component gain adjusting unit 28 receives the output signal from the HPF 22 and the judgment results from the video image judging unit 24 and the ringing judging unit 26, applies an amplification process, a limiter process, and a coring process on the output signal of the HPF 22, and outputs the resulting signal.

The limiter process is a process to limit the absolute value of the output signal of the contour component gain adjusting unit 28 so that a predetermined limit value is not exceeded. The coring process is a process to inhibit the absolute value of the output signal when the absolute value of the input signal of the contour component gain adjusting unit 28 is from 0 to within a predetermined range.

In the present embodiment, the contour component gain adjusting unit 28 changes the amplification (gain) depending on whether the process target pixel is the edge portion, the edge periphery portion, the texture portion, or the flat portion. More specifically, when the process target pixel is the edge portion or the texture portion, the output signal from the HPF 22 is amplified, but the amplification (gain) in this case is set greater for the case where the pixel is the texture portion than for the case where the pixel is the edge portion. In addition, when the process target pixel is the edge periphery portion or the flat portion, the amplification (gain) is set to 0 so that amplification is not executed and the noise in the edge periphery portion and the flat portion is not emphasized.

Figure 4:
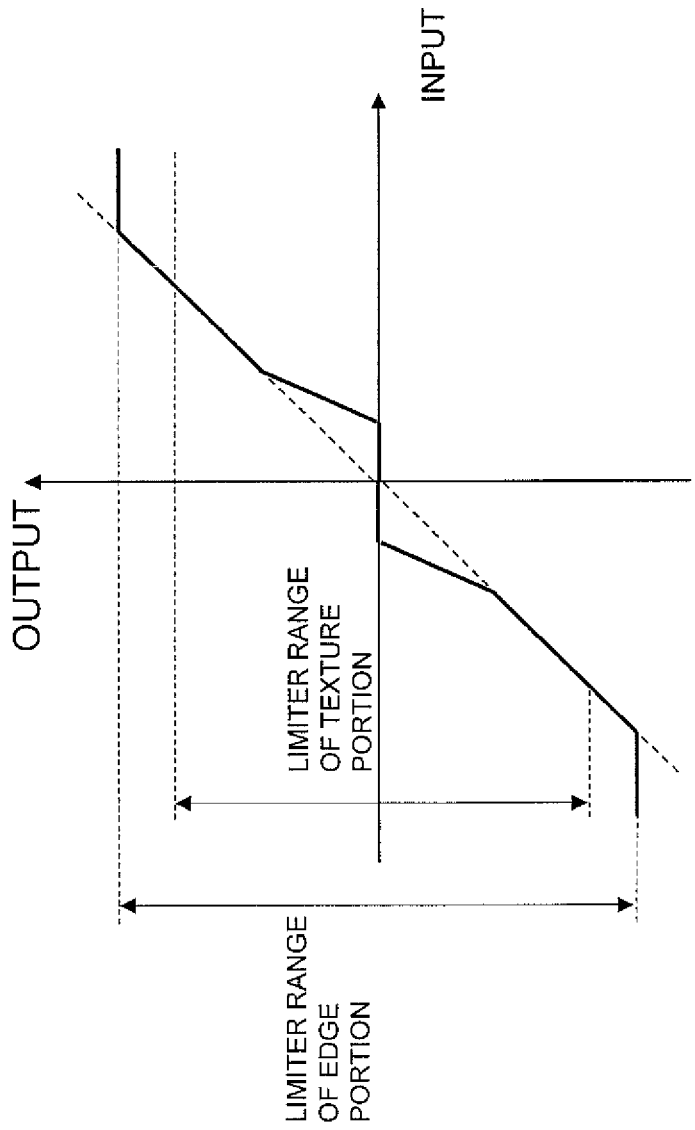
FIG. 4 is a diagram for explaining a limiter process in a preferred embodiment of the present invention.
Figure 5:
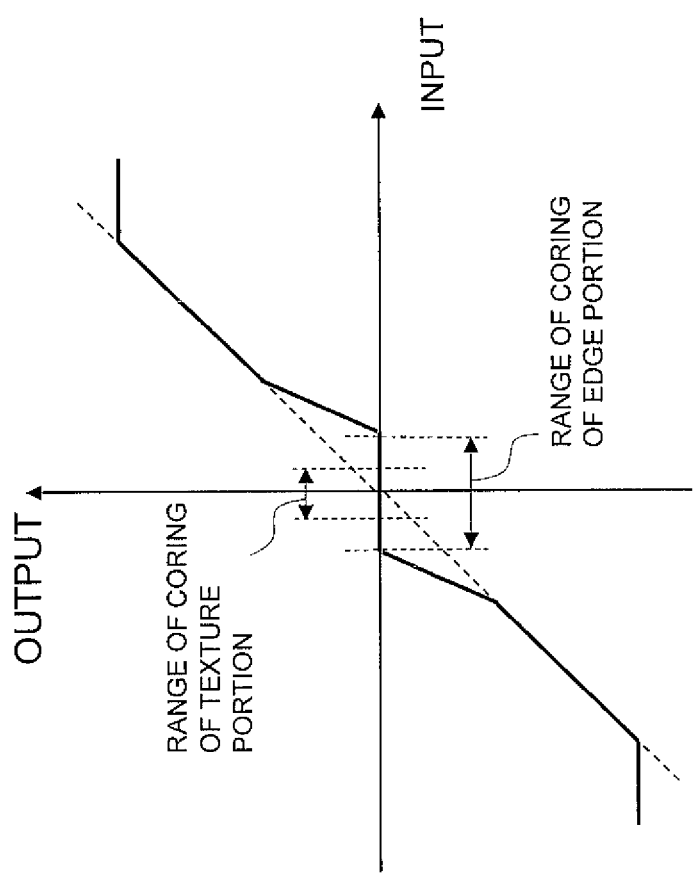
FIG. 5 is a diagram for explaining a coring process in a preferred embodiment of the present invention.

The contour component gain adjusting unit 28 also changes the thresholds value for the limiter process and the coring process depending on whether the process target pixel is the edge portion or the texture portion. More specifically, when the process target pixel is the edge portion, the range of the limiter process is set larger compared to the case where the pixel is the texture portion. In other words, as shown in FIG. 4, when the process target pixel is the edge portion, the range is set so that the limiter starts to operate at a larger output signal from the HPF 22 compared to the case where the pixel is the texture portion. In addition, when the process target pixel is the edge portion, the range of the coring process is set larger compared to the case of the texture portion. In other words, as shown in FIG. 5, when the process target pixel is the edge portion, the range of the coring is set such that the output is inhibited in a wider range of the output signal from the HPF 22 compared to the case of the texture portion. In FIGS. 4 and 5, the input signal is shown by a broken line and the output signal to which the limiter process and the coring process are applied in the edge portion is shown by a solid line.

When the process target pixel is the edge periphery portion or the flat portion, it is preferable to not apply the limiter process and the coring process.

In this manner, by adjusting the amplification process, the limiter process, and the coring process depending on whether the process target pixel is the edge portion, the edge periphery portion, the texture portion, or the flat portion, it is possible to suitably emphasize the edge (contour) component having a large change and the texture component having a finer change, and to prevent unnecessary emphasis of the noise in the flat portion.

The contour component gain adjusting unit 28 also changes the amplification (gain) according to the level showing the degree of possibility of occurrence of ringing, and applies the amplification process. That is, the amplification (gain) is set such that the amplification for the process target pixel is reduced (attenuation is increased) as the possibility of occurrence of ringing becomes higher. For example, in the case of level 0, no attenuation is applied, in the case of level 1, the current amplification is reduced to ½, and in the case of level 2, the current amplification is reduced to ¼.

Figure 6:
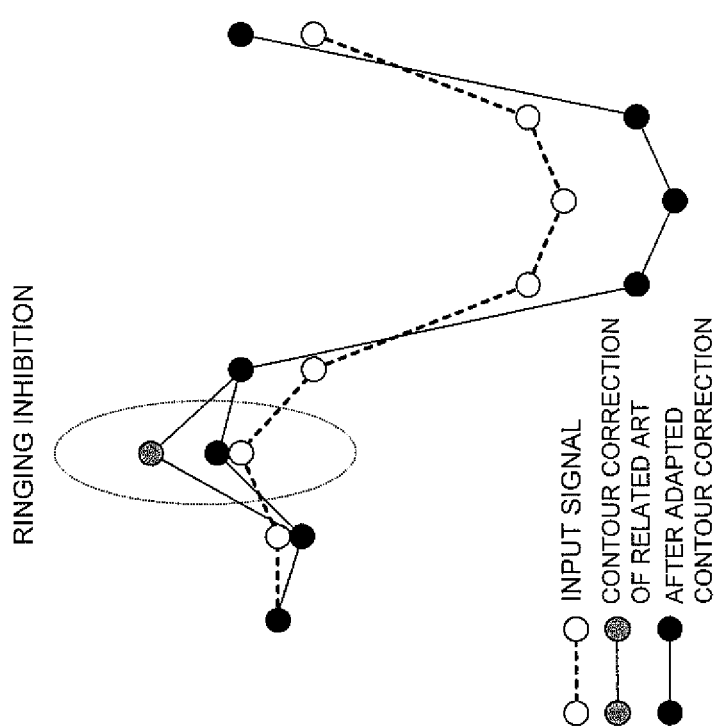
FIG. 6 is a diagram for explaining a ringing inhibiting process in a preferred embodiment of the present invention.
Figure 7:
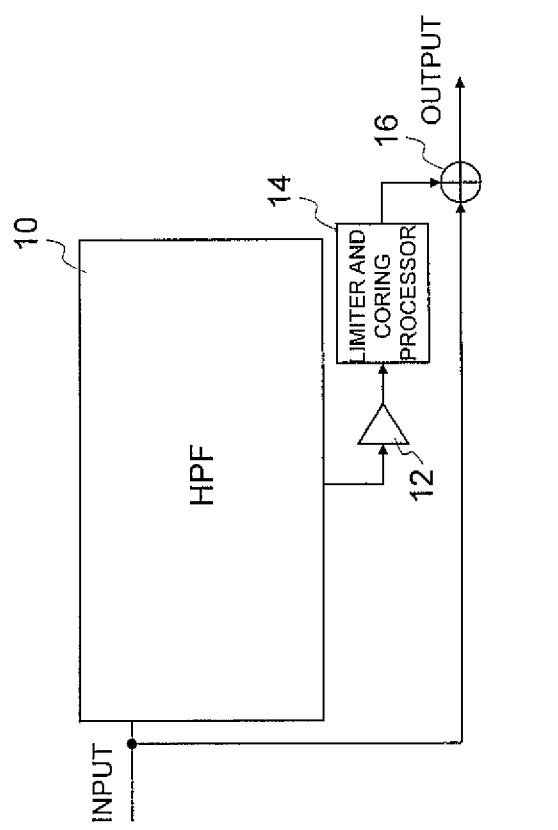
FIG. 7 is a diagram showing a structure of a contour correction device of related art.
Figure 8:
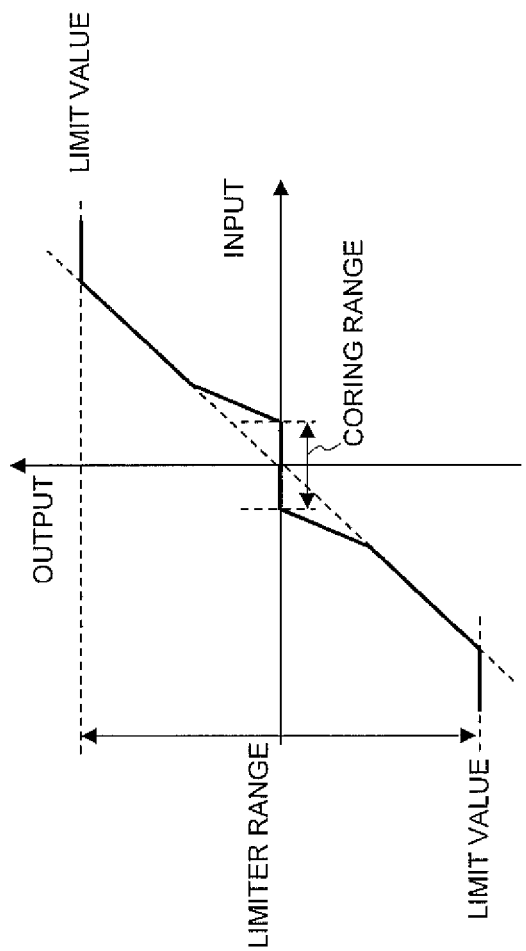
FIG. 8 is a diagram for explaining a limiter process and a coring process.
Figure 9:
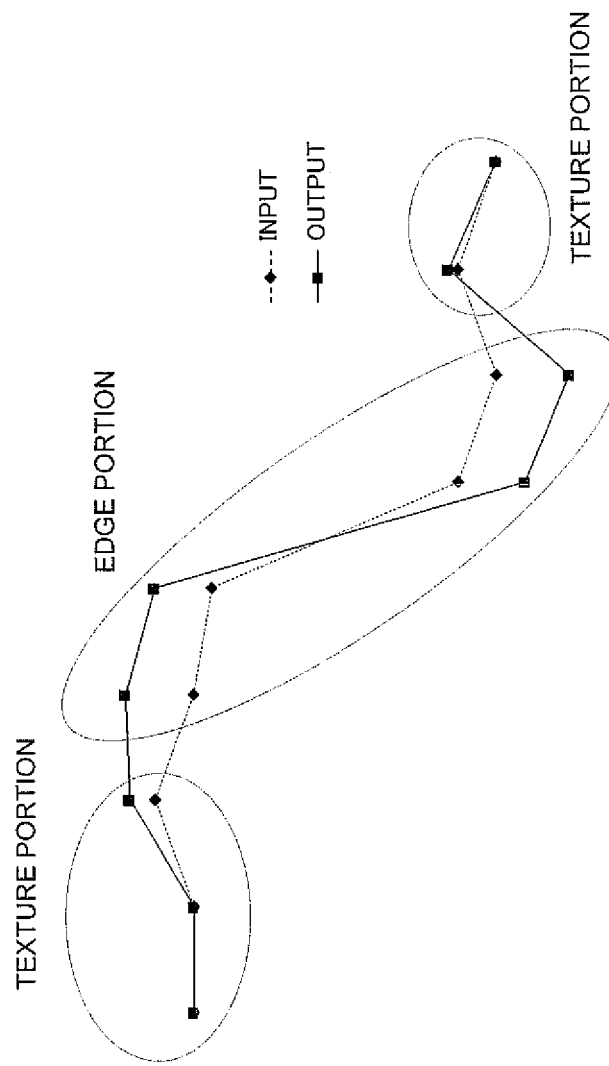
FIG. 9 is a diagram for explaining a problem in a contour correction process.

By applying the amplification process while changing the amplification (gain) according to the level indicating the degree of possibility of occurrence of ringing, as shown in FIG. 6, it is possible to inhibit an extreme increase of the brightness at the edge periphery portion in the contour correction process in the present embodiment shown by a thick solid line compared to the contour correction process of the related art shown by a thin solid line. In other words, extreme contour correction at the periphery portion of the edge is inhibited and the occurrence of ringing can be inhibited.

The adder 30 adds the input signal and the output signal of the contour component gain adjusting unit 28, and outputs the resulting signal. In this process, it is preferable to provide a delay circuit (not shown) in the adder 30 in consideration of the delays of the signals in the delay units 20a-20d, the HPF 22, the video image judging unit 24, the ringing judging unit 26, and the contour component gain adjusting unit 28, so that the signal of the process target pixel at the input signal, and the signal of the process target pixel to which the processes up to the contour component gain adjusting unit 28 are applied, are added.

What is claimed is:

1. A contour correction device, comprising:
   a video image judging unit which executes an edge detection process to detect a change of a signal in a video image as an edge portion and a texture detection process to detect a texture portion in which a change of a signal smaller than the edge portion repeatedly appears in the video image, wherein the edge detection process is executed for a process target range within the video image to determine if a process target pixel is in an edge portion by setting each pixel within the process target range as a pixel of interest, taking a difference between the pixel of interest and a pixel adjacent to the pixel of interest in a horizontal direction or a vertical direction and judging the process target pixel to be in the edge portion in response to the difference being greater than or equal to a predetermined edge detection threshold value, and wherein the texture detection process detects the texture portion by determining a number of boundaries detected within a texture detection range from the pixel of interest is greater than or equal to a predetermined number, where a boundary is determined as a difference between the signal of the pixel of interest and a signal of an adjacent pixel that is adjacent to the pixel of interest being greater than or equal to a texture detection threshold value and smaller than the edge detection threshold value, and
   a contour correction unit which applies contour correction processes which differ from each other to the edge portion and to the texture portion, wherein the contour correction unit sets a smaller range of a coring process when the process target pixel is in the texture portion than when the process target pixel is in the edge portion, sets a smaller range of a limiter process when the process target pixel is in the texture portion than when the process target pixel is in the edge portion, and sets a higher gain for a signal of the video image for the texture portion than for the edge portion.

2. The contour correction device according to claim 1, wherein
   the video image judging unit executes an edge periphery detection process to detect a periphery portion of the edge portion in the video image as an edge periphery portion, and
   the contour correction unit applies a contour correction process which differs from those for the edge portion and the texture portion to the edge periphery portion.

3. The contour correction device according to claim 2, wherein
   the video image judging unit executes a flat portion detection process to detect a region which is not the edge portion, the texture portion, or the edge periphery portion in the video image as a flat portion, and
   the contour correction unit applies a contour correction process which differs from those for the edge portion and the texture portion to the flat portion.

4. The contour correction device according to claim 3, wherein the contour correction unit sets a lower gain for a signal of the video image in the flat portion than in the edge portion and the texture portion.

5. The contour correction device according to claim 2, wherein the contour correction unit sets a lower gain for a signal of the video image in the edge periphery portion than in the edge portion and the texture portion.

6. The contour correction device according to claim 1, further comprising:
   a ringing judging unit which detects a position where ringing occurs in the video image, wherein
   the contour correction unit sets a gain for a signal of the video image to a lower value for a position where the ringing occurs than for the other positions.

7. The contour correction device according to claim 1, further comprising:
   a plurality of sequential delay units that each store a respective horizontal line of the video image, in succession; and
   a high pass filter that extracts the high frequency components of each of the delay units and an undelayed input, and provides the high frequency components to the contour correction unit.

8. A contour correction circuit, comprising:
   a plurality of delay units arranged in a sequence, where each delay unit holds a respective prior horizontal line of a video image from an input horizontal line, where each horizontal line comprises a plurality of pixel values for a respective pixel location in the video image;
   a video image judging unit that receives an output from each delay unit and input horizontal line and executes an edge detection process to detect edge portions and a texture detection process to detect texture portions in the video image;
   wherein the edge detection process is executed for a process target range within the video image to determine if a process target pixel is in an edge portion by setting each pixel within the process target range as a pixel of interest, taking a difference between the pixel of interest and a pixel adjacent to the pixel of interest in a horizontal direction or a vertical direction and judging the process target pixel to be in the edge portion in response to the difference being greater than or equal to a predetermined edge detection threshold value;
   wherein the texture detection process detects the texture portion by determining a number of boundaries detected within a texture detection range from the pixel of interest is greater than or equal to a predetermined number, where a boundary is determined as a difference between the signal of the pixel of interest and a signal of an adjacent pixel that is adjacent to the pixel of interest being greater than or equal to a texture detection threshold value and smaller than the edge detection threshold value;
   a high pass filter that extracts the high frequency components of each of the delay units and the input horizontal line; and
   a contour correction unit which applies contour correction processes to the edge portions and to the texture portions, wherein the correct process applied to the edge portions differ from those applied to the texture portions, and wherein the contour correction processes are based on the output of the high pass filter.

9. The contour correction circuit of claim 8, wherein
   the video image judging unit executes an edge periphery detection process to detect a periphery portion of the edge portion in the video image as an edge periphery portion, and the contour correction unit applies a contour correction process which differs from those for the edge portion and the texture portion to the edge periphery portion.

10. The contour correction circuit of claim 9, wherein the contour correction unit sets a lower gain for a signal of the video image in the edge periphery portion than in the edge portion and the texture portion.

11. The contour correction circuit of claim 9, wherein the video image judging unit executes a flat portion detection process to detect a region which is not the edge portion, the texture portion, or the edge periphery portion in the video image as a flat portion, and the contour correction unit applies a contour correction process which differs from those for the edge portion and the texture portion to the flat portion.

12. The contour correction circuit of claim 11, wherein the contour correction unit sets a lower gain for a signal of the video image in the flat portion than in the edge portion and the texture portion.

13. The contour correction circuit of claim 8, further comprising:

a ringing judging unit which detects a position where ringing occurs in the video image, wherein the contour correction unit sets a gain for a signal of the video image to a lower value for a position where the ringing occurs than for the other positions.

14. The contour correction circuit of claim 8, wherein the contour correction unit sets a smaller range of a coring process when the process target pixel is in the texture portion than when the process target pixel is in the edge portion, sets a smaller range of a limiter process when the process target pixel is in the texture portion than when the process target pixel is in the edge portion, and sets a higher gain for a signal of the video image for the texture portion than for the edge portion.

15. A method for contour correction of a video image, comprising:

executing an edge detection process for a process target range within the video image to determine if a process target pixel is in an edge portion by setting each pixel within the process target range as a pixel of interest, taking a difference between the pixel of interest and a pixel adjacent to the pixel of interest in a horizontal direction or a vertical direction and judging the process target pixel to be in the edge portion in response to the difference being greater than or equal to a predetermined edge detection threshold value;

executing a texture detection process to detect a texture portion by determining a number of boundaries detected within a texture detection range from the pixel of interest is greater than or equal to a predetermined number, where a boundary is determined as a difference between the signal of the pixel of interest and a signal of an adjacent pixel that is adjacent to the pixel of interest being greater than or equal to a texture detection threshold value and smaller than the edge detection threshold value; and applying contour edge correction processes and texture correction processes, respectively, which differ from each other, to the detected edge portions and to the detected texture portions, including:

setting a smaller range of a coring process when the process target pixel is in the texture portion than when the process target pixel is in the edge portion, and setting a smaller range of a limiter process when the process target pixel is in the texture portion than when the process target pixel is in the edge portion, and sets a higher gain for a signal of the video image for the texture portion than for the edge portion.

16. The method of claim 15, further comprising:

executing an edge periphery detection process to detect a periphery portion of the edge portion in the video image as an edge periphery portion; and applying a contour correction process which differs from those for the edge portion and the texture portion to the edge periphery portion.

17. The method of claim 15, further comprising:

executing a flat portion detection process to detect a region which is not the edge portion, the texture portion, or the edge periphery portion in the video image as a flat portion; and applying a contour correction process which differs from those for the edge portion and the texture portion to the flat portion.

18. The method of claim 17, further comprising setting a lower gain for a signal of the video image in the edge periphery portion than in the edge portion and the texture portion.

19. The method of claim 15, further comprising:

detecting a position where ringing occurs in the video image; and setting a gain for a signal, for a position where the ringing occurs, of the video image to a lower value than for the other positions.

* * * * *